US010025287B2

(12) United States Patent
Prosak et al.

(10) Patent No.: US 10,025,287 B2
(45) Date of Patent: Jul. 17, 2018

(54) METHOD FOR ASSIGNMENT OF VERIFICATION NUMBERS (71) Applicant: Rockwell Automation Germany GMBH & Co. KG, Wuppertal (DE)

(72) Inventors: Bradley Alan Prosak, Shaker Heights, OH (US); Thomas Helpenstein, Grevenbroich (DE); Rudolf Papenbreer, Wuppertal (DE); Mussa Tohidi Khaniki, Wuppertal (DE); Norbert Machuletz, Wetter (DE); Oliver Heckel, Frechen (DE)

(73) Assignee: Rockwell Automation Germany GMBH & Co. KG (DE)

( * ) Notice: Subject to any disclaimer, the term of this patent is extended or adjusted under 35 U.S.C. 154(b) by 348 days.

(21) Appl. No.: 14/673,097

(22) Filed: Mar. 30, 2015

(65) Prior Publication Data

US 2016/0291566 A1 Oct. 6, 2016

(51) Int. Cl.
*G05B 11/01* (2006.01)
*G05B 19/05* (2006.01)
(Continued)

(52) U.S. Cl.
CPC .......... *G05B 19/058* (2013.01); *G06F 8/654* (2018.02); *G06F 8/665* (2013.01); *G06F 21/121* (2013.01);
(Continued)

(58) Field of Classification Search
CPC .............. G05B 19/058; G05B 19/0428; G05B 2219/14006; G05B 2219/23464;
(Continued)

(56) References Cited

U.S. PATENT DOCUMENTS 4,897,842 A * 1/1990 Herz ..................... G06F 11/277
714/732
5,920,715 A 7/1999 Heckel et al.
(Continued)

FOREIGN PATENT DOCUMENTS

EP 1748336 A2 1/2007
WO 2011082863 A1 7/2011

OTHER PUBLICATIONS

Extended European Search Report dated Aug. 25, 2016; Application No. 16161823.6—(9) pages.

*Primary Examiner* — Thomas Lee
*Assistant Examiner* — Zhipeng Wang
(74) *Attorney, Agent, or Firm* — Boyle Fredrickson, SC (57) ABSTRACT An industrial controller for safety control is disclosed. The controller comprises an interface for receiving a download of a safety control program, a memory for storing at least one safety control program and at least one processing unit for executing a safety control program stored in the non-volatile memory. The at least one processing unit is configured to determine whether a safety control program is verified and to limit an execution of an unverified safety control program according to an unverified run mode. An indicator is configured to indicate the execution of an unverified safety control program. A method of assigning a verification ID to an industrial controller comprises steps of configuring and downloading a safety control program, validating the configured safety control program for the target industrial controller, and assigning a verification ID. Execution of the configured safety control program is limited before the verification ID is assigned.

15 Claims, 5 Drawing Sheets

(51) Int. Cl.

| | |
|---|---|
| *G06F 8/654* | (2018.01) |
| *G06F 9/445* | (2018.01) |
| *G06F 21/12* | (2013.01) |
| *G06F 21/44* | (2013.01) |
| *G06F 21/57* | (2013.01) |
| *G06F 21/85* | (2013.01) |
| *G05B 19/042* | (2006.01) |

(52) U.S. Cl.
CPC ............ *G06F 21/44* (2013.01); *G06F 21/572* (2013.01); *G06F 21/85* (2013.01); *G05B 19/0428* (2013.01); *G05B 2219/14006* (2013.01); *G05B 2219/23464* (2013.01)

(58) Field of Classification Search
CPC ...... G06F 21/121; G06F 21/44; G06F 21/572; G06F 21/85; G06F 8/665
See application file for complete search history.

(56) References Cited

U.S. PATENT DOCUMENTS

| | | | |
|---|---|---|---|
| 2005/0071022 A1* | 3/2005 | Izzo .................. | G05B 19/0428 700/79 |
| 2010/0213964 A1* | 8/2010 | Bogenberger ... | G01R 31/31701 324/750.3 |
| 2010/0241901 A1* | 9/2010 | Jahn ................. | G05B 19/41885 714/26 |
| 2011/0125302 A1* | 5/2011 | Sethuraman ............ | G05B 9/02 700/97 |
| 2012/0036499 A1* | 2/2012 | Neupartl ............... | G05B 19/056 717/126 |
| 2012/0050612 A1* | 3/2012 | Schutt ..................... | H04N 5/04 348/511 |
| 2014/0075197 A1 | 3/2014 | Alrabady et al. | |
| 2015/0254123 A1* | 9/2015 | Loekstad ........... | G06F 11/0724 714/42 |
| 2016/0259313 A1* | 9/2016 | Liu .................... | G05B 19/0428 |

* cited by examiner

METHOD FOR ASSIGNMENT OF VERIFICATION NUMBERS

BACKGROUND

The present disclosure relates generally to industrial automation and control systems, such as those used in industrial and commercial settings. More particularly, the present disclosure relates to high reliability or safety industrial controllers and safety control programs as well as methods for validating and verifying safety control programs appropriate for use in and with devices intended to protect human life and health and/or machine integrity.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, i.e. on or off or analog, providing a value within a substantially continuous range. The inputs may be obtained from sensors attached to the controlled process and the outputs may be provided to actuators on the controlled process.

Safety systems are systems intended to ensure the safety of humans working in the environment of an industrial process. Safety systems and control programs are also used for ensuring machine integrity. Such systems may include the electronics associated with emergency stop buttons, light curtains and other machine lockouts. Traditionally, safety systems have been implemented by a set of redundant circuits separate from the industrial control system used to control the industrial process with which the safety system is associated. Such safety systems have been hardwired from switches and relays, including specialized safety relays which provide comparison of redundant signals and internal checking of all conditions, such as welded or stuck contacts. More recently, safety systems have also been aligned with or integrated in standard control devices, systems and processes.

Safety control can be implemented in various manners, depending on the required control complexity and safety complexity, which takes into account the number of controlled zones. A safety controller can be provided in the form of a safety relay for local, small-scale and/or simple safety control, as a module for a modular, more complex configuration or as a more sophisticated but still compact programmable logic controller, fulfilling certain safety ratings. A compact safety controller can be employed within a complex safety network. Safety relays, on the other hand, are particularly useful for small scale emergency stop applications.

A safety device oftentimes is configured to comply with standardized safety requirements, such as a safety integrity level (SIL). On the other hand, it is desirable to enable users to configure not only standard control devices, but also a safety controller or safety relay by means of software, using an editor program. In general, this bears the risk that an inappropriately configured safety control program downloaded to an industrial controller fails to operate within safety requirements, thereby jeopardizing human life and health as well as machine integrity. It is, on the other hand, desirable to allow operation of an industrial controller executing a newly configured safety control program to test the performance of the industrial controller executing said safety control program for certain safety requirements, which may be standardized or customized. Accordingly, there is a need in the art for enabling flexible configuration of a safety control program for a software-configurable industrial controller for safety control in a manner that is safe and does not take compliance of the executing safety controller within safety requirements for granted.

BRIEF DESCRIPTION

In one embodiment of the present disclosure, an industrial controller for safety control comprises an interface configured for uploading a safety control program from the industrial controller and configured for receiving a download of a safety control program to the industrial controller. A non-volatile memory is configured for storing at least one safety control program. The industrial controller further comprises at least one processing unit for executing a safety control program stored in the non-volatile memory. The at least one processing unit is configured, by software or other means, to determine whether a safety control program is verified and is further configured to limit an execution of a safety control program determined to be unverified according to an unverified run mode. The industrial controller further comprises an indicator to indicate the unverified run mode during an execution of a safety control program according to said unverified run mode. A safety control program that is verified is identified by storing an assigned verification ID (VID), which can be a verification number, in the industrial controller. The limiting of the execution of an unverified safety control program may be achieved by a timer, wherein expiry of the timer stops an execution of the unverified safety control program.

In another embodiment of the present disclosure, a method of assigning a verification ID to an industrial controller comprises configuring a safety control program. The configured safety control program is downloaded to a target industrial controller, which preferably is a safety relay or a safety controller for industrial automation. The configured safety control program is validated. The validation is preferably for the safety control program with respect to execution by the target industrial controller and/or the intended controlled process and/or controlled devices. As a result of a successful or complete validation, a verification ID is assigned. An execution of the configured safety control program by said target industrial controller is limited, as long as no verification ID is assigned. The verification ID may be assigned to the configured safety control program or to the target industrial controller running same.

In another embodiment of the present disclosure, one or more non-transitory computer-readable media having computer-executable instructions are provided which, when executed, perform a process of assigning a verification ID for a safety control program. The process comprises a step of receiving input indicating a validation of a safety control program for a target industrial controller and/or controlled process. A verification ID is assigned to the safety control program and/or target industrial controller. The validated safety control program is downloaded together with the assigned verification ID to the target industrial controller. Said downloading may comprise re-downloading a previously downloaded and configured safety control program together with the integrated or incorporated assigned verification ID.

DESCRIPTION OF THE DRAWINGS

These and other features, aspects and advantages of the present disclosure will become better understood when taking into account the following detailed description with reference to the accompanying drawings, in which like characters represent like parts throughout the drawings, wherein.

DETAILED DESCRIPTION

While the present disclosure may be susceptible to various modifications and alternative forms, specific embodiments are shown by way of example in the drawings and are described in detail herein. However, it should be understood that the embodiments are not intended to be limited to the particular forms disclosed. Rather, the disclosure is to cover all modifications, equivalents and alternatives falling within the spirit and scope of the disclosure as defined by the appended claims. Further, although individual embodiments are discussed here in a simplified explanation, the disclosure is intended to cover all combinations of these embodiments.

Figure 2A:
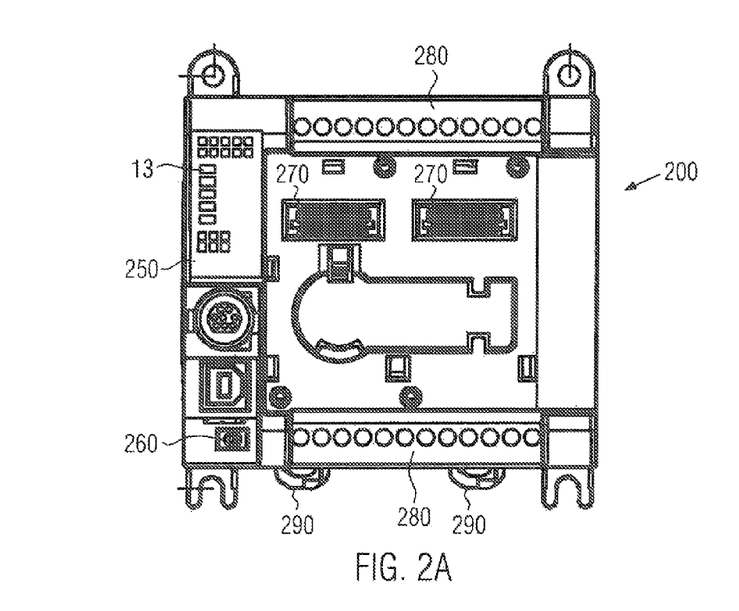
FIG. 2A illustrates a view of a safety relay in accordance with an embodiment.
Figure 2B:
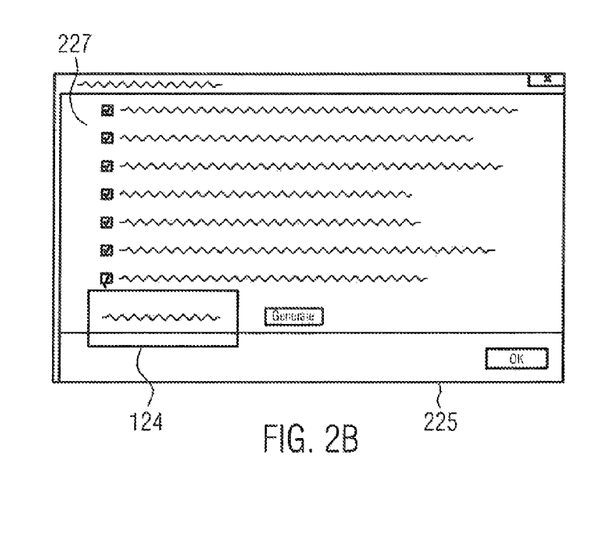
FIG. 2B illustrates an aspect of a graphical user interface of an editor system in accordance with an embodiment.
Figure 2C:
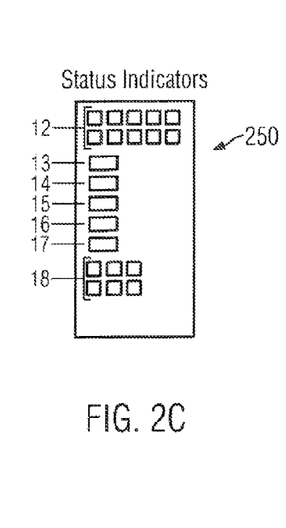
FIG. 2C illustrates a detail view of the exemplary safety relay of FIG. 2A.
Figure 3A:
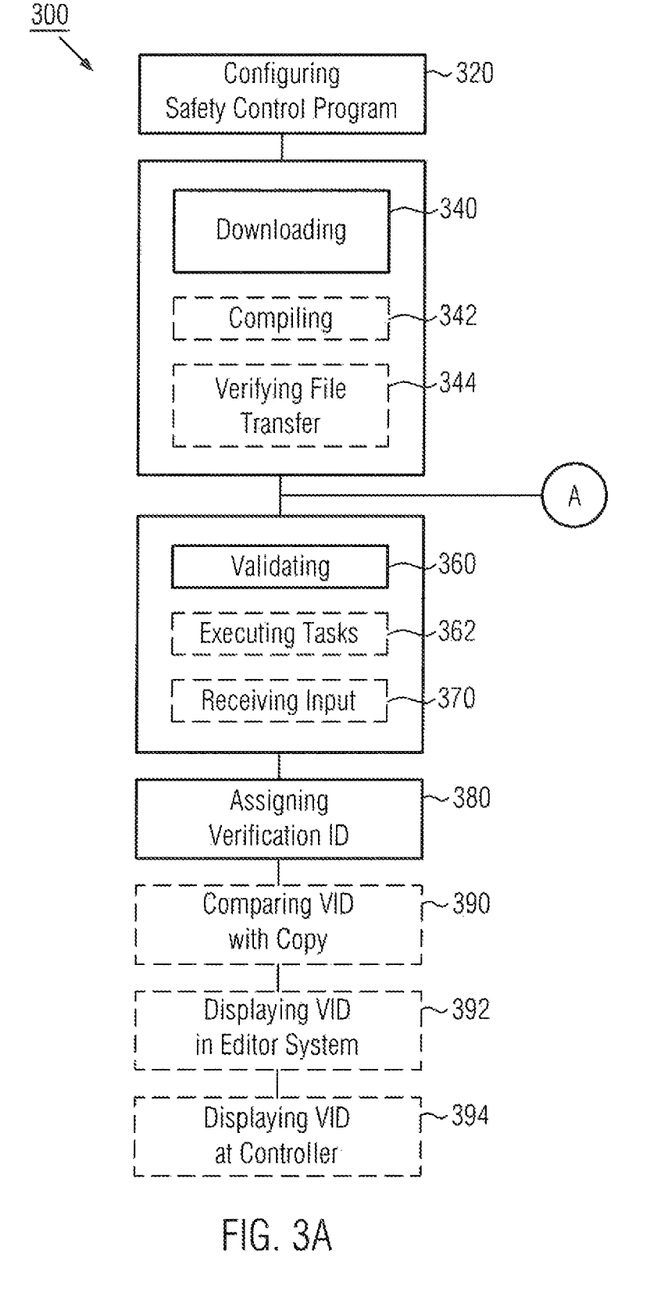
FIG. 3A illustrates a process flow diagram for a method of assigning a verification ID in accordance with present embodiments.
Figure 3B:
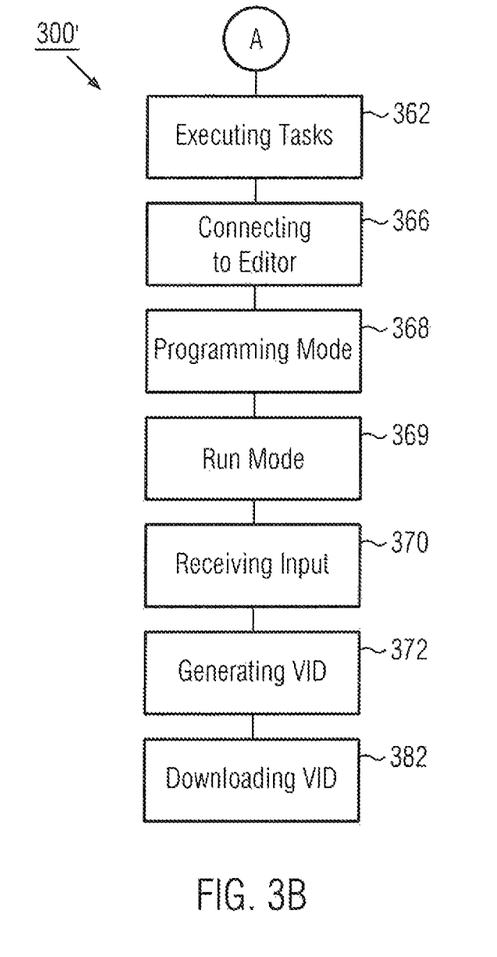
FIG. 3B illustrates a process flow diagram for a method of assigning a verification ID in accordance with present embodiments.

Specifically, while methods are described with respect to FIGS. 3A and 3B, in other embodiments steps of the method described in relation to FIG. 3B are combined with steps of the method according to FIG. 3A, where not contradicting each other. According to embodiments of the present disclosure, the methods of FIG. 3A and FIG. 3B are executed by instructions stored on one or more computer-readable media. Similarly, the process steps performed by computer-executable instructions described in relation to FIG. 4 according to embodiments are a part of a method of present embodiments. Further, details and structural elements described in relation to FIGS. 1 and 2 according to embodiments combine with method steps and steps performed upon execution of computer-executable instructions as described in relation to FIGS. 3 and 4.

Further, in the following description of embodiments of the present disclosure, the term industrial controller is to be understood as comprising the meaning of a safety relay, which is a kind of small scale industrial safety controller.

According to embodiments of the present disclosure, operation of an industrial controller executing a software-configured safety control program is limited for performing test or validating tasks as long as the industrial controller is not verified for execution of said configured safety control program. Moreover, after building an industrial control project in an editor program, downloading same to the industrial controller and performing the validation, according to present embodiments, the safety control program previously configured which has been subject to the running of test tasks and checking for compliance with safety requirements and/or safety standards, is verified for running on the industrial controller. After said configuration, validation and verification, the configuration cannot be changed without losing the verified status. A verification ID or verification number can be assigned to identify a verification. The assigned verification ID may be unique within certain practical limits. Any change to a verified configuration invalidates the verification and requires a new validation and verification process. Only a verified status allows for prolonged execution of the safety control program with the industrial controller whereas according to present embodiments, the operation of an unverified safety control program is limited and indicated to the user.

Specifically, an execution of a safety control program determined by the industrial controller to be not verified is performed according to an unverified run mode, which comprises limiting the execution of the safety control program to a predetermined period of time. This can be accomplished by use of a timer, wherein upon expiry of the time period, the execution of the unverified safety control program is stopped. Exemplary timer values comprise a predetermined number of hours, for instance 24 hours, or a predetermined number of days. The timer value may also be selected by the user.

The unverified run mode can be reset by cycling power to the industrial controller, i.e. switching off the power supply to the industrial controller and switching the power back on, thereby resetting the operation of the timer. According to embodiments, the safety control program that is downloaded to the industrial controller and stored in a non-volatile memory of the industrial controller is configurable by editing software of an editing system. The industrial controller determines whether a safety control program is verified by identifying an assigned verification ID, which can be stored in the non-volatile memory of the industrial controller. A predetermined value of a verification ID may be held at any time in the industrial controller. However, the predetermined verification ID has a value that signifies that no verification ID has been assigned according to a verification process for the safety control program. Where the verification ID comprises a number of a predetermined number of digits, for instance, a four-digit decimal number, the preset verification ID value showing that no verification ID is assigned can have a value of "0000".

According to present embodiments, once a validation and verification process has been completed, an assigned verification ID is generated. This assigned verification ID can be a pseudo-random number or can be generated based at least in part on the configuration of the safety control program. Further, the assigned verification ID can be based on the industrial controller, in particular the components of the industrial controller and the firmware version running on the industrial controller.

Figure 1:
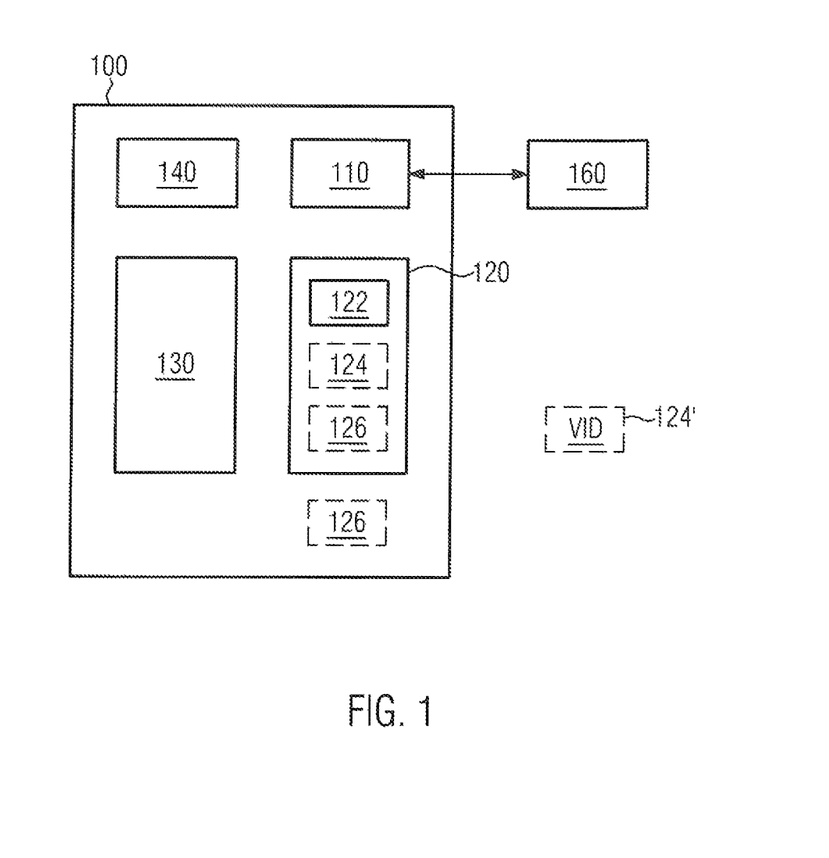
FIG. 1 illustrates a block diagram of an industrial controller for safety control in accordance with an embodiment.

Turning now to the drawings and referring first to FIG. 1, an exemplary industrial controller 100 is illustrated. An editor system 160, which may comprise a graphical user interface to configure an industrial control program, in particular a safety control program, is separate from the industrial controller 100. The industrial controller 100 comprises an interface 110 which is configured for uploading a safety control program from the industrial controller 100 and for receiving a download of a safety control program to the industrial controller 100. Specifically, download and upload are from and to an editor system 160.

A non-volatile memory 120 is provided and can store one or more safety control programs 122. At least one processing unit 130, wherein in embodiments two or three processing units are provided to increase reliability of the industrial controller 100 for safety control. Having two or more processing units 130 increases redundancy and comparability of an execution of control code.

One or more of the processing units 130 are provided for executing a safety control program 122 stored in the non-volatile memory 120. According to embodiments, only specific ones of the one or more processing units 130 execute a safety control program. The at least one processing unit 130 is configured to determine whether a safety control program 122 is verified and to limit an execution of a safety control program 122 determined to be not verified according to an unverified run mode of the industrial controller 100. The unverified run mode comprises limiting an execution of the safety control program to a predetermined period of time which, according to embodiments, is accomplished by use of a timer 126, which can be stored in the non-volatile memory 120 or be hard-wired. Alternatively, the timer 126 is held in a volatile memory of the industrial controller 100 and created upon powering on of the industrial controller 100.

An indicator 140 is configured to indicate the unverified run mode during an execution of a safety control program 122 in said unverified run mode. Said indicator 140 according to embodiments comprises a status indicator light, which can be an LED, a display element or other HMI means, including the position of a multi-position switch. According to embodiments, a verified safety control program 122 is identified by an assigned verification ID 124, which is stored in the non-volatile memory 120 of the industrial controller 100. During the generation of the assigned verification ID 124, an operator according to certain safety standards and requirements is required to manually write down the assigned verification ID 124 in addition to the editing program assigning the verification ID 124 to the safety control program and/or target industrial controller 100 and downloading the assigned verification ID 124 to the industrial controller 100. The written-down copy of the assigned verification ID 124' is held in parallel to the assigned verification ID 124, but in a separate location. Said copy of the VID 124' can be written down in a safety documentation for the industrial controller 100, can be written down by the user with a pen or marker on a memory card or on the industrial controller 100 itself. Certain specified safety audits require that the assigned verification ID 124 is written down in safety documentation of the industrial controller 100 and the presence of such a separate copy of the assigned verification ID 124' is checked during such a safety audit. A safety documentation may further include the firmware and its version, a version of the editor program, and an identification of the configured safety function(s) and project.

The indicator 140 may indicate the unverified run mode by flashing a status indicator light, according to embodiments comprising a power LED or run mode LED. Once the safety control program 122 is verified by having been assigned a verification ID 124, said status indicator light stops flashing.

Turning now to FIG. 2, an exemplary industrial controller 100 more specifically a safety relay 200, is illustrated in accordance with present embodiments. As is known in the art, the safety relay 200 may be, mounted on a rail by utilizing mounting latches 290. The safety relay 200 comprises I/O and power terminal blocks 280 and can comprise plug-in connectors 270 for connection to one or more plug-in modules. Safety relay 200 further comprises status indicators 250, which may comprise status indicator LEDs 12-18 shown in more detail in FIG. 2C.

Specifically, a specific one of the status indicator LEDs 12-18 may be used as the indicator 140 for indicating the unverified run mode. According to an exemplary embodiment, status indicator 13, which is a power status indicator, flashes during an execution of a safety control program according to the unverified run mode. According to some embodiments, the industrial controller 200 is configured to store only a single safety control program 122, and the status indicator light 13 can indicate the unverified run mode for a period during which the industrial controller 200 is powered on, as there is no other control program which could be run by the safety relay 200. In contrast, where a more flexible industrial controller 100 may store a plurality of industrial control programs comprising one or more safety control programs 122 in its non-volatile memory 120, the indication of the unverified run mode may be limited to the execution of an unverified safety control program 122 itself. Each safety control program 122 may or may not have an assigned verification ID 124 and accordingly the safety controller 100 in these embodiments distinguishes between the currently executed control program, in particular safety control program 122, and other control programs stored in non-volatile memory 120. The safety relay further comprises a verification button 260, which can be used to trigger a process of displaying an assigned verification ID 124, as described later with respect to FIG. 3A.

Turning now briefly to FIG. 2B, an aspect of a graphical user interface of editor system 160 is illustrated. A user interface element or window 225 lists a checklist 227 of tasks that the user should have tested with the industrial safety relay 200 as part of validating the configured safety control program 122 for the safety relay 200. In the illustrated step, the user has checked each of the separate items of the checklist 227 displayed in graphical user element 225. Thereafter, verification ID 124 is generated and displayed to the user, in particular so that the user may write down a copy of the assigned verification ID 124' as described above. The assigned verification ID 124 thereafter is downloaded to the industrial controller 100 or safety relay 200.

Turning now to FIG. 3A, a process flow of a method of assigning a verification ID 124 to an industrial controller 100 or safety relay 200 is illustrated. At step 320, a safety control program is configured and the configuration is completed. An editor system 160 is exemplarily used for configuring the safety control program 122. The safety control program can be built from predefined function blocks having predetermined inputs and outputs, utilizing a graphical user interface of the editor system 160.

A step 340 of downloading the configured safety control program to a target industrial controller 100 can be initiated by activating a "download" user interface button of the editor system 160. The step of downloading 340 may comprise compiling 342 the configured safety control program before the downloading. Further, in order to check consistency of the configuration of the control project within the editor program and within the industrial controller 100 to which it is downloaded, a file transfer verification can be performed at step 344. According to embodiments, the download process thereby automatically performs a file transfer verification to help ensure that the project configuration and the configuration in the target industrial controller 100 are equal and thus valid. Specifically, a file transfer verification may be negative where connection errors and/or corrupted files are encountered. According to embodiments, only a successful file transfer verification at step 344 allows a user to change the operating mode of the industrial controller 100 to a run mode of operation and execute the safety control program 122 with the industrial controller 100. If the file transfer verification in step 344 indicates a failed file transfer, the method 300 has to be partially repeated, beginning again with a user initiating the downloading at step 340.

At step 360, the configured safety control program is validated for the target industrial controller 100. The validating comprises executing test tasks at step 362. The tasks may accord to a test plan and are performed with the target industrial controller 100 executing the configured safety control program 122 according to the unverified run mode of the industrial controller 100, in which the industrial controller 100 can operate in a testing mode of operation. According to present embodiments, the unverified run mode limits the period of time in which the industrial controller 100 can be operated before the execution of the unverified safety control program 122 is stopped.

The user or customer may know how to validate and carry out appropriate tests on the target industrial controller 100 for the intended safety process and correspondingly validate the functionality of the industrial controller 100 by physically testing same. Alternatively, according to embodiments, a test plan can be provided for the user to follow, wherein the test plan works in accordance with a software wizard that automatically walks the user through a series of separate tests to validate the safety control program 122 for the industrial controller 100. According to another embodiment, a separate program develops a safety specification and provides functionality to download the safety specification built with said separate program to the industrial controller 100. According to this embodiment, functional requirements from said built safety specification are mapped to test cases that must be validated by the user utilizing the target industrial controller 100. In an embodiment, the safety specification builder program saves a file for export and the editor system 160 imports said file and reads it to run a test plan wizard, assisting in the validation. In another embodiment, the saved file may be downloaded from the safety specification builder program in a manner which is known in the art.

At step 370, user input is received that indicates a complete validation of the configured safety control program 122 for the target industrial controller 100. Referring now to the example depicted in FIG. 2B, the user has completed each item in the checklist 227 of graphical user interface element 225 and optionally may activate a "generate" button to confirm the completion of the validation in addition to checking each check box of the checklist 227. Step 370 may be initiated by the user initiating a "verify" sub routine within an editor program of editor system 160. The "generate" user interface element according to an embodiment can be grayed out until each checkbox of checklist 227 is selected, whereupon it becomes selectable for the user to continue.

At step 380, a verification ID is assigned as a result of the completion of the validating process and verification, comprising the initiation of the generation of a verification ID. The execution of the configured safety control program 122 by the target industrial controller 100 is limited before step 380, in which a verification ID is assigned and in which the assigned verification ID 124 can be downloaded to the target industrial controller 100, as described previously.

According to an embodiment, the assigned verification ID 124 is downloaded to the target industrial controller 100 together with the previously configured safety control program 122 that should already reside on the target industrial controller 100. By re-downloading the configured safety control program 122 with the assigned verification ID 124 back into the target industrial controller 100, it is advantageously ensured that this assigned verification ID 124 actually is assigned for the intended safety control program 122. According to an embodiment, the assigned verification ID 124 is incorporated within the verified, configured safety control program 122 before optionally recompiling same and before re-downloading same to the target industrial controller 100. According to further embodiments, the assigned verification ID 124 can be encrypted before downloading to the target industrial controller 100. Further, the target industrial controller 100 may comprise a device ID which can operate as a decryption key for an encrypted assigned verification ID 124. Encryption and decryption may utilize hashing functionality as per se known in the art.

FIG. 3A furthermore illustrates steps 390 to 394, which may be performed in any order at any later time. At step 390, the assigned verification ID 124 is compared with a copy of the assigned verification ID 124. As described above, the copy of the assigned verification ID 124' can be stored or documented by a handwritten note, by an entry in a text file or electronic document, which may be comprise a safety documentation for the target industrial controller 100. Further, a memory card or the target industrial controller 100 itself may be annotated with a marker or pen. Certain safety standard requirements necessitate periodic testing of the industrial controller 100 and safety control systems, for example, every six months. These tests are provided to ensure that the safety functions have not been subject to manipulation or tampering. For instance, a safety audit for verifying compliance with safety standards compares the copy of the assigned verification ID 124' with the assigned verification ID 124 stored in the non-volatile memory 120 of an industrial controller 100. To look up the assigned verification ID 124 stored in the industrial controller 100, the assigned verification ID 124 can be uploaded to the editor system 160 and displayed at a step 392 in the editor system 160, preferably by a graphical user interface of the editor system 160. In an embodiment, the assigned verification ID 124 is uploaded from the target industrial controller 100 upon connecting the target industrial controller 100 with the editor system 160. Further, it may be necessary to not only connect the target industrial controller 100 with the editor system 160, but to also select the target industrial controller 100 within the graphical user interface of editor system 160.

Alternatively, or in addition to step 392, the assigned verification ID 124 can also be displayed at the target industrial controller 100. According to embodiments, a plurality of status indicator lights 250 of the target industrial controller 100 can be utilized to display the assigned verification ID 124. The process can be initiated by a user activating predetermined input means 260 of the target industrial controller 100, which may comprise a verification button. According to an embodiment, and now referring to FIG. 2C, a plurality of input status LEDs 12 of status indicators 250 and a plurality of output status LEDs 18 are utilized to convey a verification ID number value to a user. The LEDs 12 and 18 in conjunction with the verification button 260 can be used to view the assigned verification ID 124 without the use of a connected editor system 160 and compare the documented copy of the assigned verification ID 124' with the assigned verification ID 124 stored within the industrial controller 100. Further, the preset verification ID number value signifying that no verification ID has been assigned can be displayed utilizing the same LEDs 12 and 18.

In an example, a four-digit verification number 124 can be conveyed to the user by cycling through the digits using the verification button 260, wherein the output status LEDs 18 indicate the respective digit and wherein the input status LEDs 12 indicate the decimal value at the digit indicated by the output status LEDs 18. The process can be initiated by pressing and releasing the verification 260 once. Cycling through the digits of the verification number 124 can be accomplished by pressing the verification button 260 within a predetermined period of time of, for instance, five seconds after the last actuation of the verification button 260.

Turning now to FIG. 3B, a modified process flow is illustrated according to a method 300' in accordance with embodiments of the present disclosure. The method 300' may continue from stage "A" of FIG. 3A with step 362 of executing tasks of a test plan with the target industrial controller 100 which executes the configured safety control program 122 according to an unverified run mode, as described above with respect to FIG. 3A.

At step 366, the target industrial controller is connected to an editor system 160. At step 368, the target industrial controller 100 operates in a programming mode for receiving the user input indicating a completion of the validation process for the configured safety control program 122 for the target industrial controller 100. During the programming mode, the target industrial controller 100 is not operable to execute the safety control program 122. Before generating the verification ID by the editor system 160 at step 372, the operation of the target industrial controller 100 at step 369 is switched back to a run mode of operation, in which the target industrial controller 100 is operable to execute the configured safety control program 122. Thereby returning to the run mode of operation, according to an embodiment allows for automatic identification of the current firmware running on the target industrial controller 100 and the hardware as well as software components of the target industrial controller 100. According to embodiments, the assigned verification ID 124 can be generated in a customized manner, taking into account these specifics of the target industrial controller 100, comprising the firmware, hardware and/or software components. After generating the verification ID by the editor system 160 at step 372, the generated verification ID is downloaded at step 382 to the target industrial controller 100. According to embodiments, thereby a verification ID 124 is assigned to the target industrial controller 100 and/or the configured safety control program 122 running on the target industrial controller 100.

Figure 4:
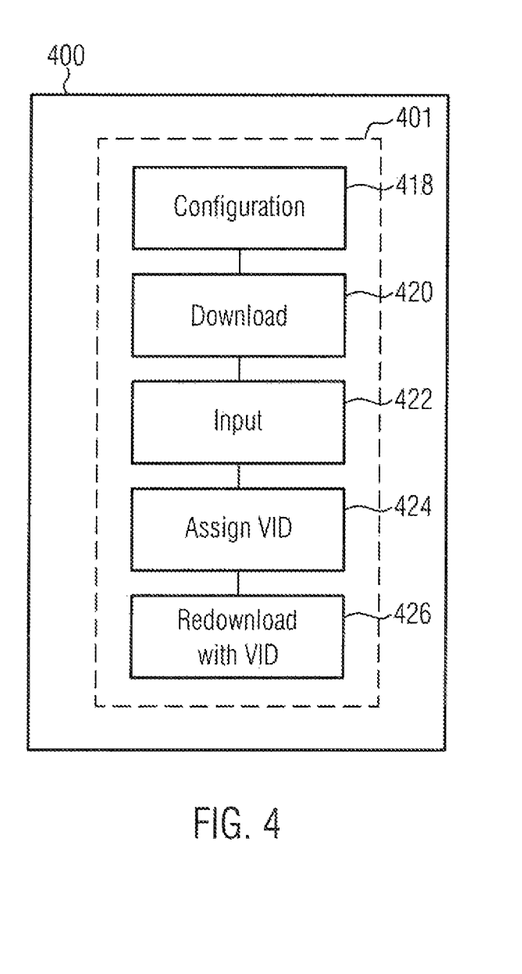
FIG. 4 illustrates a block diagram of computer-readable media comprising instructions which, when executed, perform steps of assigning a verification ID in accordance with an embodiment.

Turning now to FIG. 4, one or more non-transitory computer-readable media 400 comprising computer-executable instructions 401 are illustrated, wherein the instructions 401, when executed, perform steps of a method for assigning a verification ID to a target industrial controller 100. According to instructions 401, at step 418, a configuration of a safety control program is completed and the respective safety control project is built. An editor system 160 comprising an editing program can be used as previously described. At step 420, the safety control program is downloaded to a target industrial controller 100. At this stage, the configuration is in an unverified state. This means that a user has not confirmed that the configuration and the installation meets all specified operational and environmental safety requirements of the machine to which the industrial controller 100 for safety control is to be fixed.

At step 422, input is received and processed, wherein the input indicates a complete validation of the configured safety control program 122 for the target industrial controller 100. The validation, can be accomplished in accordance with the previously described processes. At step 424, a verification ID is assigned to the configured safety control program 122 and/or the target industrial controller 100.

Where the target industrial controller 100 comprises a safety relay 200, only a single safety control program 122 may be stored in a non-volatile memory 120 at any time and therefore assigning a verification ID 124 to the safety relay 200 is sufficient. In contrast, where a more complex industrial controller 100 for safety control may comprise more than one safety control program 122, a verification ID 124 may be assigned to any single one of the stored safety control programs 122 or to a combination of any one of the stored safety control programs 122 with the target industrial controller 100.

At step 426, the validated safety control program 122 is downloaded together with the assigned verification ID 124 to the target industrial controller 100. Providing the assigned verification ID 124 together with the completely configured safety control program 122, which according to embodiments is already present on the target industrial controller 100, serves to ensure that the specific safety control program 122 is indicated as verified, which is actually stored on the target industrial controller 100 for running on same. Thereby, re-downloading said safety control program 122 together with the integrated or incorporated assigned verification ID 124 increases integrity of the safety control system and thus further enhances safety.

The invention claimed is:

1. An industrial controller for safety control, comprising:
an interface removably connected to the industrial controller, wherein when the interface is connected to the industrial controller, the interface is configured for uploading a first safety control program from the industrial controller and for downloading of a second safety control program to the industrial controller;
a non-volatile memory configured for storing at least one safety control program and a verification ID associated with the at least one safety control program, wherein at least a portion of the verification ID is a random or pseudo-random number;
at least one processing unit for executing a safety control program selected from the at least one safety control program stored in the non-volatile memory, the at least one processing unit being configured to determine whether the safety control program is verified and to limit execution of the safety control program to an unverified run mode when the safety control program is determined to be not verified;
an indicator configured to indicate the unverified run mode during execution of the safety control program according to the unverified run mode;
a verification input operative to initiate display of the verification ID on the industrial controller when the interface is disconnected from the industrial controller; and
a plurality of status indictors, wherein each of the plurality of status indicators corresponds to an operating condition of the industrial controller during operation in a verified state and wherein the at least one processing unit is further configured to display the verification ID rather than the status of the corresponding operating condition utilizing the plurality of status indicators responsive to the verification input.

2. The industrial controller of claim 1, wherein the unverified run mode comprises limiting an execution of the safety control program to a predetermined period of time.

3. The industrial controller of claim 2, wherein the unverified run mode is reset by cycling power to the industrial controller.

4. The industrial controller of claim 1, wherein the at least one safety control program stored in the non-volatile memory is configurable by an editing software and downloaded to the industrial controller via the interface.

5. The industrial controller of claim 1, wherein the determining whether the safety control program is verified comprises identifying the verification ID stored in the non-volatile memory.

6. The industrial controller of claim 5, wherein the assigned verification ID is generated based at least in part on a configuration of at least one of the safety control program and the industrial controller for which the safety control program is verified.

7. The industrial controller of claim 1, wherein the unverified run mode is limited to a period of time by a timer, wherein the industrial controller is configured to stop execution of the safety control program according to the unverified run mode upon expiry of the timer.

8. The industrial controller of claim 1, comprising a safety relay or safety controller for industrial automation.

9. A method of confirming validation of a safety control program on an industrial controller, the method comprising the steps of:
    connecting a target industrial controller to an editor system adapted for configuring the safety control program;
    configuring a safety control program with the editor system;
    downloading the configured safety control program to the target industrial controller from the editor system;
    validating the configured safety control program for the target industrial controller;
    receiving a user input indicating a complete validation of the configured safety control program for the target industrial controller;
    assigning a verification ID responsive to receiving the indication, wherein at least a portion of the verification ID is a random or pseudo-random number wherein an execution of the configured safety control program by the target industrial controller is limited before the verification ID is assigned;
    storing the verification ID in a non-volatile memory of the industrial controller; and
    initiating display of the verification ID on the industrial controller with a verification input located on the industrial controller when the editor system is disconnected from the target industrial controller; and
    displaying the assigned verification ID on a plurality of status indicators at the target industrial controller responsive to the verification input, wherein each of the plurality of status indicators corresponding to an operating condition of the industrial controller during operation in a verified state and the verification ID is displayed rather than the corresponding operating condition.

10. The method of claim 9, wherein the validating comprises executing tasks of a test plan with the target industrial controller executing the configured safety control program according to an unverified run mode.

11. The method of claim 10, wherein the test plan is generated for at least one of the target industrial controller and the configured safety control program, based on at least one of specified safety requirements and safety standards.

12. The method of claim 10, further comprising:
    operating the target industrial controller in a programming mode for receiving the user input indicating the complete validation of the configured safety control program for the target industrial controller, wherein the target industrial controller is not operable to execute the safety control program in the programming mode;
    switching operation of the target industrial controller to a run mode of operation in which the target industrial controller is operable to execute the configured safety control program;
    generating the verification ID by the editor system; and
    downloading the generated verification ID to the target industrial controller.

13. The method of claim 12, wherein the downloading comprises downloading the generated verification ID together with the configured safety control program.

14. The method of claim 9, further comprising the step of:
    comparing the assigned verification ID with a copy of the assigned verification ID,
    the copy of the assigned verification ID being stored or documented by at least one of a note, a text file or document, such as a safety documentation for the target industrial controller, or annotating at least one of a memory card and the target industrial controller with a pen.

15. The method of claim 9, further comprising the step of:
    displaying the assigned verification ID in an editor system, comprising uploading the assigned verification ID from the target industrial controller, and
    displaying the assigned verification ID at the target industrial controller, utilizing a plurality of status indicators of the target industrial controller in response to a user activating predetermined input means of the target industrial controller.

* * * * *